United States Patent
Aziz et al.

(10) Patent No.: US 10,700,846 B1
(45) Date of Patent: Jun. 30, 2020

(54) CLOCK DATA RECOVERY CONVERGENCE USING SIGNED TIMING INJECTION

(71) Applicant: NVIDIA Corp., Santa Clara, CA (US)

(72) Inventors: Pervez Mirza Aziz, Dallas, TX (US); Vishnu Balan, Saratoga, CA (US); Viswanath Annampedu, Plano, TX (US)

(73) Assignee: NVIDIA Corp., Santa Clara, CA (US)

( * ) Notice: Subject to any disclaimer, the term of this patent is extended or adjusted under 35 U.S.C. 154(b) by 0 days.

(21) Appl. No.: 16/386,029

(22) Filed: Apr. 16, 2019

(51) Int. Cl.
*H04L 7/033* (2006.01)
*H04L 25/03* (2006.01)
*H04L 7/00* (2006.01)

(52) U.S. Cl.
CPC .......... *H04L 7/0331* (2013.01); *H04L 7/0058* (2013.01); *H04L 25/03057* (2013.01); *H04L 2025/03369* (2013.01)

(58) Field of Classification Search
CPC ......... H03L 7/08; H03L 7/0807; H03L 7/099; H03L 7/0991; H04L 7/0058; H04L 7/0331; H04L 25/03006; H04L 25/03019; H04L 25/03057; H04L 2025/03369

USPC ....... 375/232, 233, 326, 327, 348, 350, 375, 375/376; 708/322, 323
See application file for complete search history.

(56) References Cited

U.S. PATENT DOCUMENTS

| | | | | |
|---|---|---|---|---|
| 8,860,467 | B2* | 10/2014 | Malipatil | H03L 7/00 327/3 |
| 9,197,396 | B1* | 11/2015 | Srinivasa | H04L 7/0016 |
| 9,882,703 | B1* | 1/2018 | Xu | H04L 7/033 |
| 10,355,889 | B1* | 7/2019 | Huss | H04L 25/03057 |
| 2006/0062341 | A1* | 3/2006 | Edmondson | H03L 7/0814 375/376 |
| 2013/0148712 | A1* | 6/2013 | Malipatil | H04L 25/0307 375/233 |
| 2018/0316356 | A1* | 11/2018 | Moballegh | H03L 7/0807 |

* cited by examiner

*Primary Examiner* — Young T Tse
(74) *Attorney, Agent, or Firm* — Rowan TELS LLC

(57) ABSTRACT

A system for data and clock recovery includes a timing error detector, a phase detector, and a phase increment injector. The phase increment injector may be used to determine an increment to affect an output of the phase detector or a clocking element. A sign of the increment is determined from a sign or direction of an accumulated version of a clock and data recovery gradient value.

10 Claims, 15 Drawing Sheets

Truth table for illegal symbol detector

| vB(n) | vA(n) | vC(n) | ŷ(n) | Illegal Data Detector Output | Comment |
|---|---|---|---|---|---|
| 1 | 0 | x | 1 | 0 | y(n) is positive so vC(n) is not relevant. |
| 1 | 1 | x | 0 | 1 | y(n) is positive so vC(n) is not relevant. |
| 0 | x | 0 | 0 | 1 | y(n) is negative so vA(n) is not relevant. |
| 0 | x | 1 | -1 | 0 | y(n) is positive so vA(n) is not relevant. |

CLOCK DATA RECOVERY CONVERGENCE USING SIGNED TIMING INJECTION

BACKGROUND

This disclosure pertains to the field of clock and data recovery in a communication channel.

A communication system 100, as shown in FIG. 1, includes a transmitter (TX), transmission medium or channel, and a receiver (RX). The transmitter transmits digitally encoded data through the communication channel, which introduces inter-symbol interference to the transmitted data at the channel output. The receiver processes the channel output using an "equalizer" to mitigate the effects of the inter-symbol interference. The receiver also samples the channel output at particular time instances to properly detect (e.g., slice) the received data without error. Examples of communication channels include read channels for data storage, high speed serial links, deep space satellite communication channels etc. The high speed serial link used in the NVLINK technology developed by nVIDIA Corporation is another example.

Equalizers in the receiver are used to mitigate the effects of inter-symbol interference. Examples of equalizers are the continuous time linear equalizer (CTLE), the sampled data finite impulse response (FIR) filter (also known as a receiver feed forward equalizer (FFE)), and the decision feedback equalizer (DFE). One or more of these equalizers may be optionally used in a receiver implementation.

A data detector at the receiver generates detected data bits or symbols. An example of a data detector is a simple latch or data slicer, which slices a voltage at a programmable threshold. Another example of a data detector is an analog to digital converter (ADC), which produces a multi-bit output from which the data may be detected and from which an estimate of the error in the detected data may also be computed. Another example of a (more complex) data detector is a maximum-likelihood sequence detector (also known as a Viterbi detector). A Viterbi detector is typically used in conjunction with a preceding analog to digital converter stage.

In addition to mitigating the effects of inter-symbol interference or other impairments, the receiver must use a clock and data recovery system to sample the signal at a desirable sampling phase before the sampled data is detected using the data detector. A typical clock and data recovery is a feedback or control system and includes three key components:

(1) a phase detector to convert received amplitude information to an estimate of the error in sampling time and phase present at the current sampling interval;

(2) a loop filter that filters unwanted noise and jitter present in the phase detector estimate; and (3) a timing adjustment mechanism such that the loop filter output adjusts the sampling phase of the receiver.

Examples of timing adjustment elements are phase interpolators, voltage controlled oscillators (VCOs), phase mixers, or some combination of these example elements.

The phase detector may also be referred to as a gradient calculator, and is typically deployed to drive the clock and data recovery control loop. The phase detector may be an oversampled phase detector such a bang-bang or Alexander phase detector, or a baud rate phase detector. An oversampled phase detector uses additional sampled data to supplement the main clock and data recovery sampled data. For example, a typical bang-bang phase detector uses data sampled at 0.5 unit intervals offset from the data obtained from the clock and data recovery. In contrast, a baud rate phase detector uses only the data obtained from the clock and data recovery.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 14 illustrates a non-return to zero detector logic 1400 in accordance with one embodiment.

DETAILED DESCRIPTION

The embodiments herein are directed to baud rate clock and data recovery. However, the techniques disclosed herein may be implemented with any type of phase detector and any clock and data recovery (CDR) scheme in a communication channel employing partial response equalized receivers, such as serial links and read channels for hard disks and flash solid state drives.

A clock and data recovery loop filter may be a second order proportional and integral loop. Being a feedback control system, a clock and data recovery may have a finite convergence or settling time. The clock and data recovery applies decisions from the data detector. Therefore errors in the data decisions may impact the effectiveness of the clock and data recovery convergence. This may be particularly the case if the initial sampling phase of the receiver (which is arbitrary) happens to be at the edge (i.e., 0.5T where T is the clock interval) away from the correct or optimal sampling phase in the center of the received bit cell. This may also be the case if there is a large frequency offset between the transmitted data bit frequency and the receiver clock frequency before the CDR is able to converge. In such scenarios, the convergence time may be especially long if the initial sampling phase is further from the optimal sampling phase. Disclosed herein are embodiments of a method and apparatus to improve the convergence of the clock and data recovery in such a scenario.

An error detector may be utilized to detect pathological errors symptomatic of severe timing errors in a partial response system. When such errors are detected, an additional increment may be injected or added to the clock and data recovery timing estimate. The increment may be injected or added to the phase detector output (gradient) or other points in the clock and data recovery path. The sign of the increment may be determined by examining the sign or direction of an accumulated version of the clock and data recovery gradient value from the past. The error detection mechanism may be subject to various criteria, such as requiring the number of errors to exceed a threshold over a given window. The gradient injection increment may be programmable. The injection mechanism may accelerate and thus improve the overall convergence of the clock and data recovery.

The disclosed embodiments may be implemented as all-digital solutions and thus readily implemented with minor changes to conventional components, such as register transfer level (RTL) code. There is no reliance on the presence of a preamble sequence in the transmitted data. Both the error detector and the injection mechanism may be implemented digitally. This may enable programmable configuration and control in particular implementations.

Figure 2:
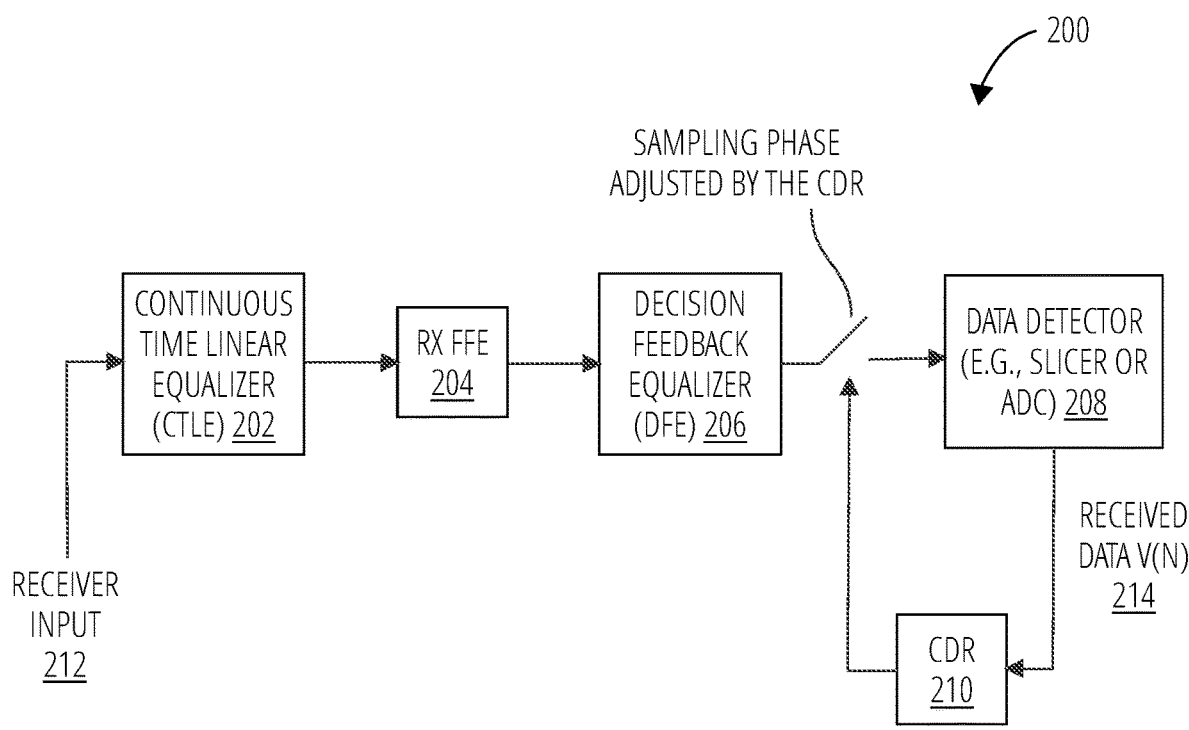
FIG. 2 illustrates a receiver 200 in accordance with one embodiment.

A block diagram of an exemplary receiver 200 is shown in FIG. 2. The receiver equalization and data detection may be implemented by a partial response system. A partial response system equalizes the received signal such that there may be a carefully controlled and a priori determined relationship between consecutive values of (a) equalized received symbols, and (b) the transmitted data. For example in a duobinary partial response system, the nominal relationship (assuming no other impairments and perfect equalization) between the transmitted data and the data slicer output in the receiver may be expressed as:

$$y(n)=a(n)+a(n-1) \qquad \text{Equation 1}$$

where y(n) is the data slicer output at symbol time n and a(n) and a(n-1) are the transmitted data bits at symbol times n and n-1 respectively. The data slicer output y(n) may be decoded into a final received estimate of the transmitted data value, v(n). In the absence of errors, v(n) may match a(n). A block diagram of an exemplary receiver with partial response equalization 400 is shown in FIG. 4.

Figure 4:
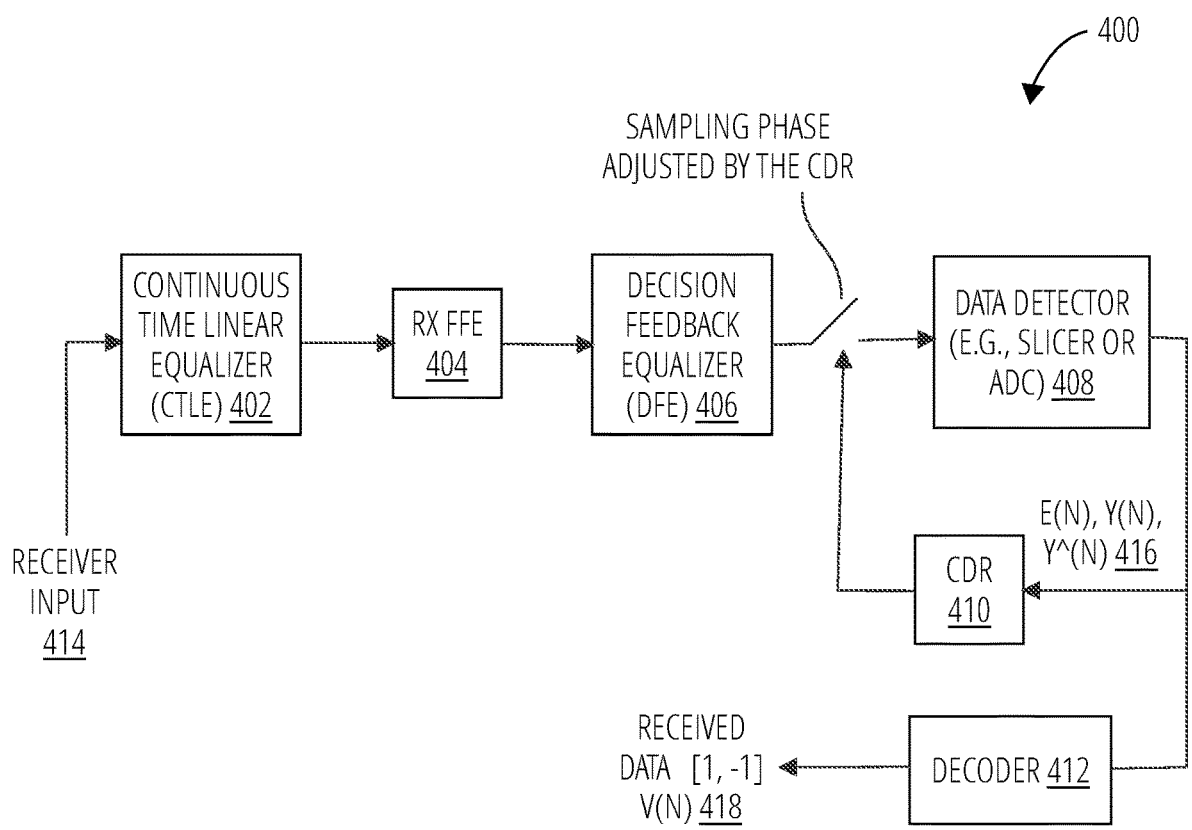
FIG. 4 illustrates a receiver with partial response equalization 400 in accordance with one embodiment.

Referring to the receiver with partial response equalization 400 of FIG. 4, let y(n) be the received symbol value at the output of the analog to digital converter. These symbols may include all impairments in the system, including inter-symbol interference, noise, cross talk, etc. The decision estimates of the impairment partial response symbols y(n) at the output of the receiver's analog to digital converter may be denoted by ŷ(n). These may take on values of 2, 0, −2 in this example. Let e(n) be the difference or error between the received symbol and its decision estimate.

$$e(n)=y(n)-\hat{y}(n) \qquad \text{Equation 2}$$

An exemplary timing gradient Δ(n) is the Mueller and Muller timing gradient, and may be given by the next equation.

$$\Delta(n)=y(n)\hat{y}(n-1)-y(n-1)\hat{y}(n) \qquad \text{Equation 3}$$

This gradient may also be written as:

$$\Delta(n)=e(n)\hat{y}(n-1)-e(n-1)\hat{y}(n) \qquad \text{Equation 4}$$

Another exemplary timing gradient that may be utilized is the minimum mean squared (MMSE) derived gradient:

$$\Delta(n)=e(n)[\hat{y}(n+1)-\hat{y}(n-1)]$$

which is non-causal due to utilizing a future sliced data estimate. This gradient may be written equivalently in its causal form making use of only current or past values as:

$$\Delta(n)=e(n-1)[\hat{y}(n)-\hat{y}(n-2)]$$

In one embodiment, the error e(n) may take the form of a "sign-sign" function restricted to take the values (1, −1) inclusive.

Figure 6:
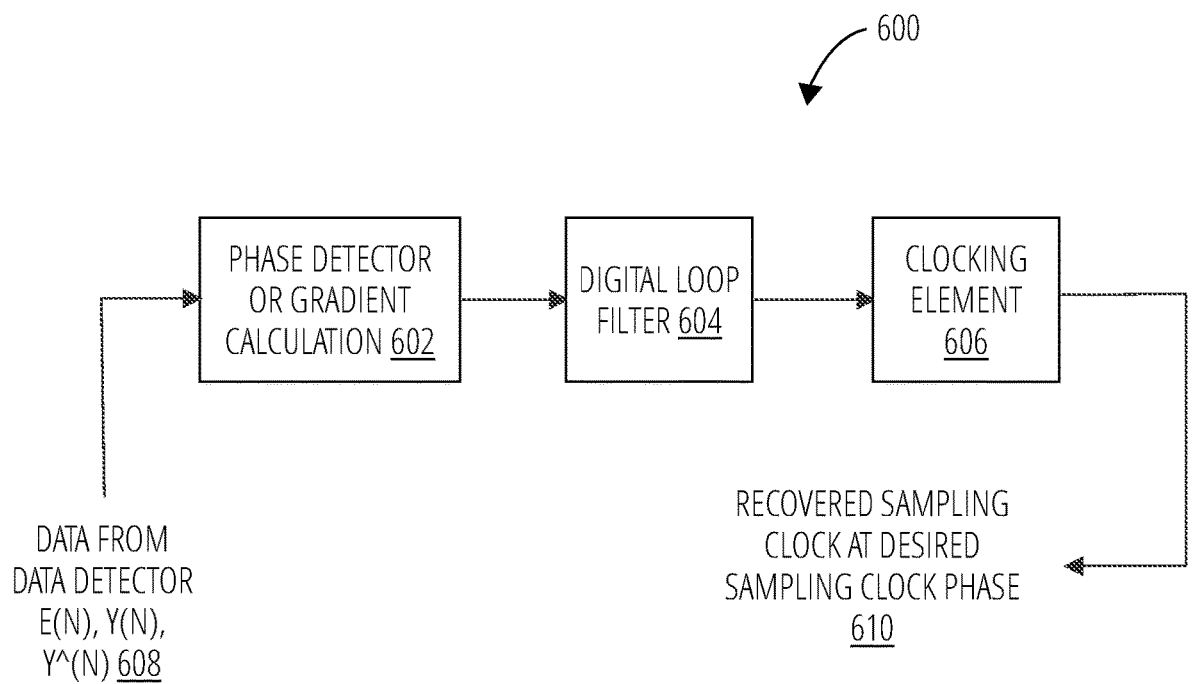
FIG. 6 illustrates a clock and data recovery system 600 in accordance with one embodiment.

These equations may define the output of the phase detector of the clock and data recovery system 600 of FIG. 6 and drive the clock and data recovery loop filter input. Alternatively, an accumulated version of the gradient may be utilized to drive the loop filter. For example if the gradient is accumulated over L symbols:

$$\Delta_L(n) = \sum_{0}^{L-1} \Delta(n) \qquad \text{Equation 5}$$

Figure 8:
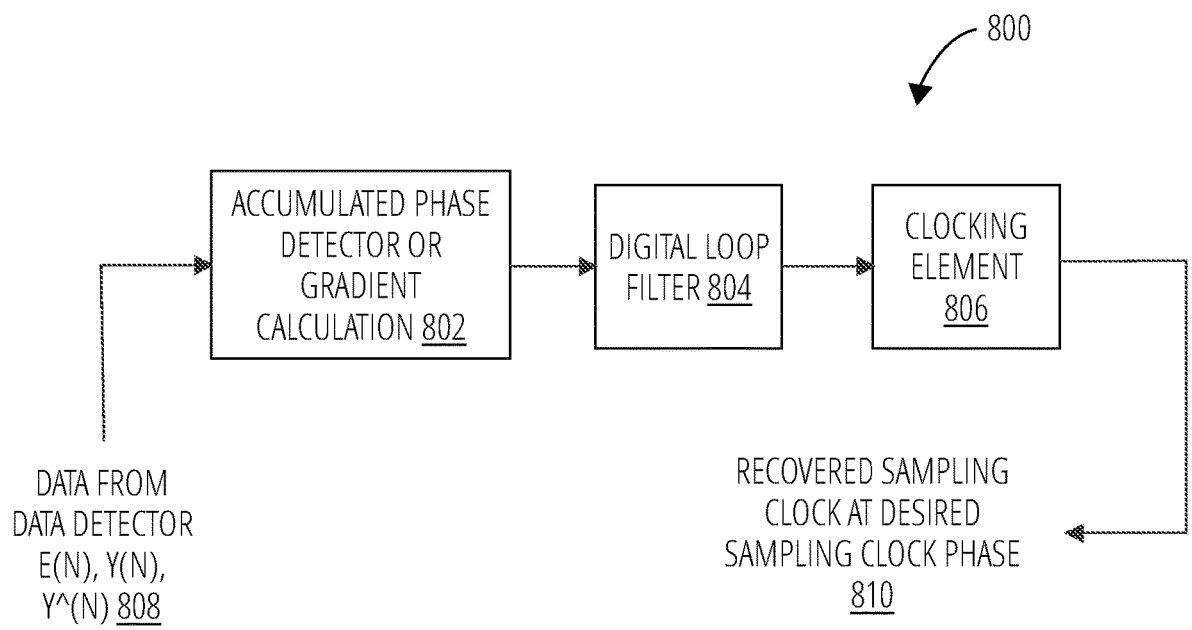
FIG. 8 illustrates a clock and data recovery system 800 in accordance with another embodiment.

An example use of the accumulated gradient driving the loop filter instead of the raw gradient driving the loop filter is shown in the clock and data recovery system 800 of FIG. 8.

At the optimal clock and data recovery sampling phase, a partial response system's consecutive equalized data detected symbols may have a clear relationship. For example, in the 1+D or partial response system as noted in Equation 1, for a transmitted data sequence comprised of symbols 1 and −1, the impairment less received sequence of decisions may take on values of 2, 0, or −2. In the absence of significant sampling phase or timing errors, the partial response may constrain the received symbols at the output of the data slicer to be such that a 2 can never be followed by a subsequent −2 or vice-versa.

However, if the initial sampling phase is 0.5T offset from the optimal sampling phase, or in the presence of large frequency offsets between the transmitter and receiver clocks, the relationship may be violated and may be detected digitally with a digital error detector by examining the corresponding data sliced symbols. This fact may be exploited to detect such illegal symbol detected conditions using an illegal data detector. The illegal data detector may count occurrences of consecutive illegal conditions (i.e., 2 followed by −2 or −2 followed by 2) in the ŷ( ) values.

The number of such illegal decisions may be subject to some filtering constraints, such as the number of such conditions exceeding some threshold T over some measurement window W. Having such a condition may help distinguish between cases when an illegal condition is due to a large phase/frequency error (which may result in multiple contiguous illegal cases) versus an isolated illegal condition which may be caused by instantaneous noise or jitter impairment. If the illegal condition is met, an additional increment of magnitude Km may be injected on top of the normal accumulated gradient. The injected value may also be qualified by the sign of how the gradient was accumulating in the short term past (i.e., we choose the sign of K such that it adds in the same direction which the gradient accumulation was proceeding). This is represented as:

$$K=Km^*\text{sign}(\Delta_L(n-L)) \qquad \text{Equation 6}$$

Although Equation 6 shows an exemplary value of L for how far in the past to examine $\Delta_L$, other values may also be advantageous such as $\Delta_L(n-S)$ where S is another exemplary value unequal to L—e.g., $K=Km*sign(\Delta L(n-S))$.

Figure 10:
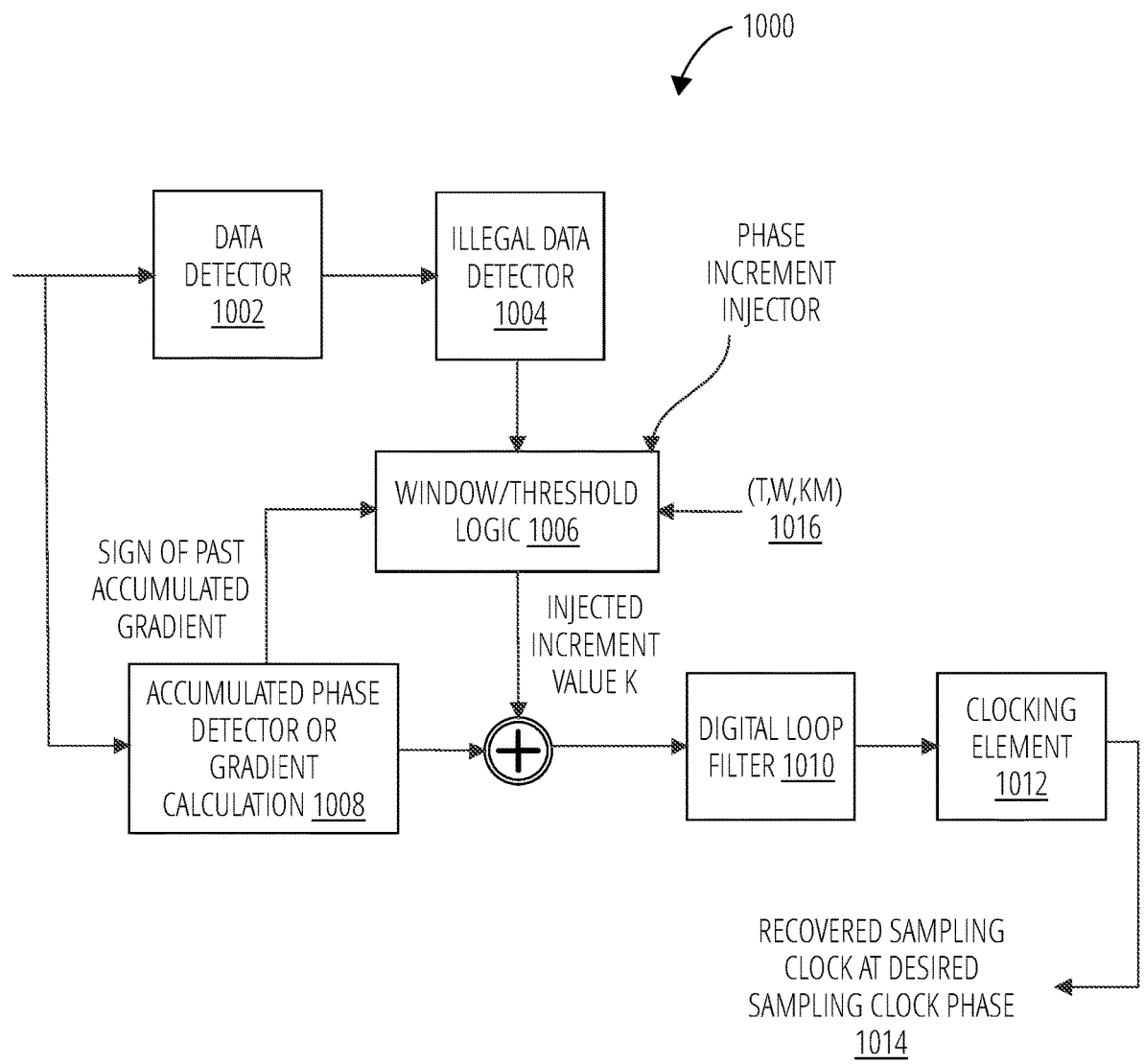
FIG. 10 illustrates a clock and data recovery system 1000 in accordance with yet another embodiment.

A block diagram of one embodiment of such a clock and data recovery system 1000 is shown in FIG. 10.

Figure 12:
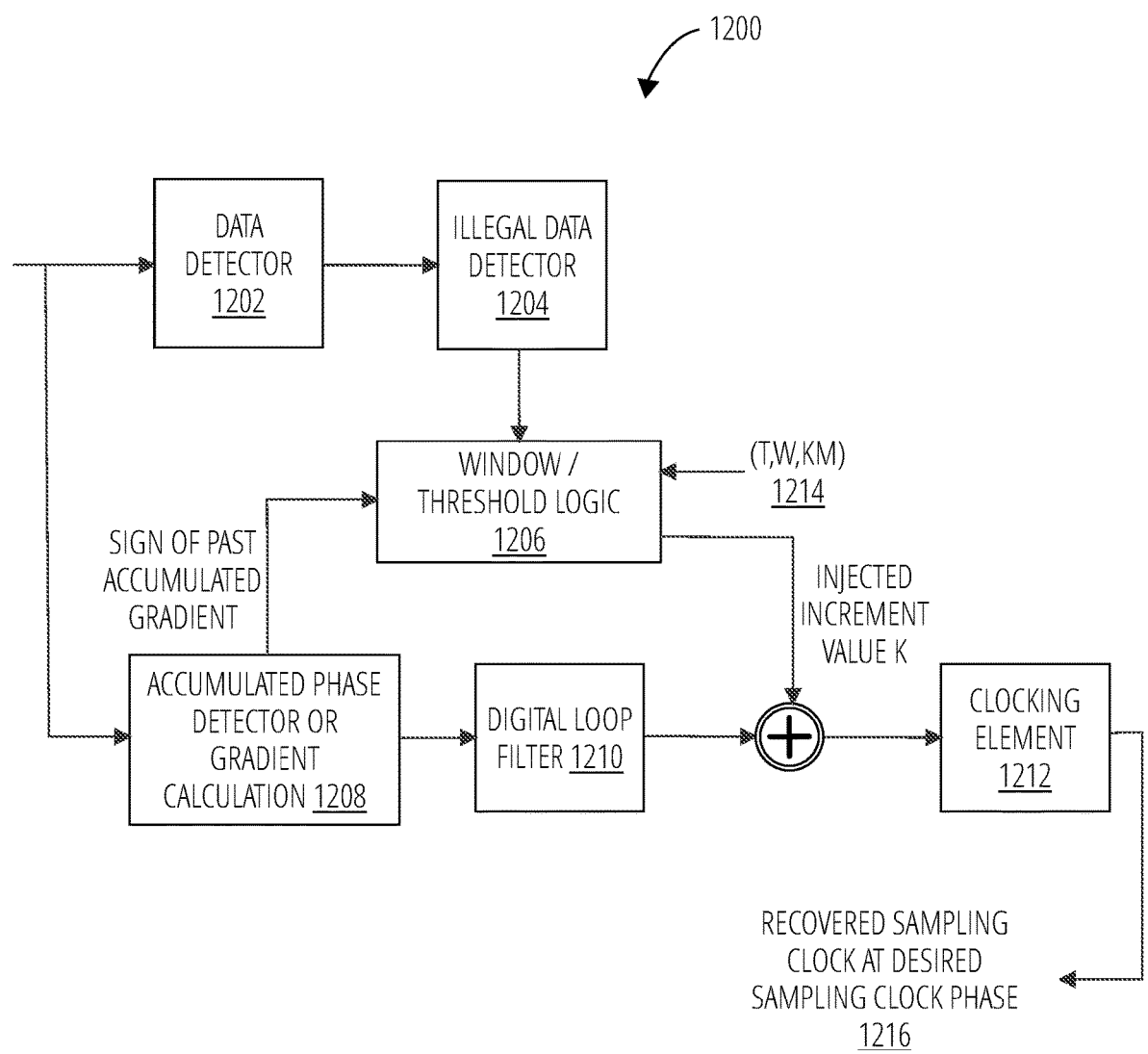
FIG. 12 illustrates a clock and data recovery system 1200 in accordance with yet another embodiment.

In this embodiment, the injected increment is not applied to the accumulated gradient but is instead applied directly to the clock element. For example if the clock element is a phase interpolator, a conventional clock and data recovery operation may utilize the clock and data recovery loop filter to instruct the phase interpolator to advance or retard by a certain phase amount or, equivalently, by a certain number of digital phase codes, as calculated by the loop filter. In embodiments of the present invention, an increment may be injected as additional phase codes the phase interpolator may traverse, in addition to what it may have been directed to traverse by the loop filter. This variation of a clock and data recovery system 1200 is shown in FIG. 12.

The disclosed mechanisms may apply to partial response systems beyond the examples discussed herein. Using a different partial response means that the criterion to determine illegal detected data symbols may change accordingly. The illegal data detection criterion may be derived from the specific partial response system under consideration.

Other embodiments may apply the injected increment value at different points within the clock and data recovery loop filter. In the example embodiments, the injected increment is applied to the timing estimate calculated at the input or output of the loop filter. Other variations may apply the injected increment to some intermediate point inside the loop filter. This may be beneficial for optimizing the fixed point details of the clock and data recovery loop filter behavior with respect to internal clipping values inside the loop filter.

According to various embodiments, disclosed system for data and clock recovery includes a timing error detector, a phase detector, and a phase increment injector. The phase increment injector may be used to determine an increment to affect an output of the phase detector. In some embodiments, a sign of the increment is determined from a sign or direction of an accumulated version of a clock and data recovery gradient value.

In some embodiments, the clock and data recovery device is configured to receive a plurality of error values for each of a plurality of data transmitted through a communication channel. The phase detector may determines the accumulated version of gradient value by Equation 5. In some embodiments, the phase detector determines the gradient value given by Equation 4 or one of the MMSE variants, wherein $\Delta(n)$ is the gradient value for symbol time n, $e(n)$ is the error for the symbol time n, and $\hat{y}(n)$ is a decision estimate for the symbol time n.

The phase increment injector may further determine a number of consecutive decision estimates, in a pre-determined measurement time interval, that satisfy one or more criteria. The phase increment injector may, in response to reaching the number to a pre-determined threshold, determine an additional increment and add the additional increment to the accumulated version of a clock and data recovery gradient value. The additional increment may be used in Equation 6, wherein K is the total increment, and Km is the magnitude of the increment. The phase increment injector subsequently may determine a total increment to affect the output of the phase detector. In some embodiments, the clock and data recovery device is a baud rate-type CDR device.

Figure 1:
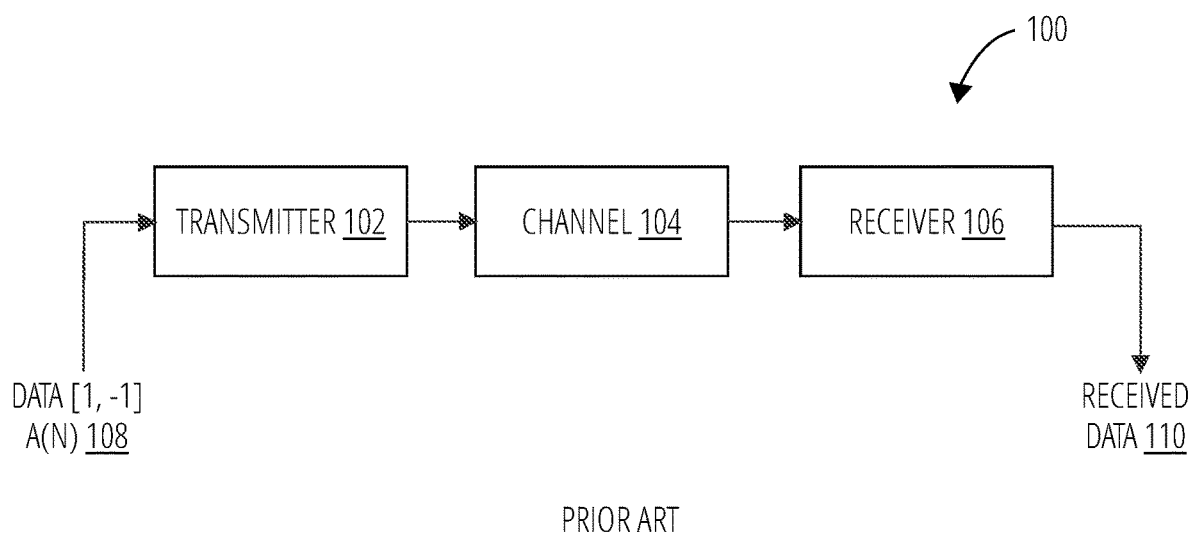
FIG. 1 illustrates a communication system 100 in accordance with one embodiment.

FIG. 1 illustrates a communication system 100 according to some embodiments. The communication system 100 includes a transmitter 102 to transmit data, a receiver 106 and a communication channel 104, e.g., a medium, through which the data is transmitted from the transmitter 102 to the receiver 106. In general, the basic purpose of a communication system 100 is to transmit data from a source, e.g., a transmitter 102, to a destination, e.g., a receiver 106.

The data being transmitted by the transmitter 102, e.g., transmitted data 108, may be received, e.g., received data 110, by the receiver 106 which is located at some point away from the transmitter 102. In various embodiments, the transmitter 102 processes the data, e.g., signal, into a form suitable for transmission over the communication channel 104. The job of receiver is to process the received data 110 to recover the appropriate message signal. If the different elements do their tasks accordingly, the received data 110 and the transmitted data 108 should be identical. Generally, there are two types of data transmission: analog and digital. Digital data communication systems have advantages such as: 1—increased immunity to noise in the channel and outside interference, 2—more flexible operation, 3—possibility of transmitting different types of data, e.g., voice, video, etc. in the same format, and 4—possibility of encrypting the data to provide security for sensitive data.

FIG. 2 illustrates a receiver 200 according to some embodiments. The receiver 200 includes receiver input 212, a continuous time linear equalizer 202, a receiver feed forward equalizer (feed forward equalizer 204), a decision feedback equalizer 206, a data detector 208 and a clock and data recovery, clock and data recovery circuit 210. In various embodiments, transmission of data through the communication channel introduces inter-symbol interference to the transmitted data at the channel output. Therefore, receiver must process the channel output using an equalizer to mitigate the effects of the inter-symbol interference. In digital communication, inter-symbol interference is a form of distortion of a data in which one symbol interferes with subsequent symbols. This undesired phenomenon has similar effect as noise, and has an adverse effect on the communication reliability. The inter-symbol interference may be caused by multipath propagation. Multipath propagation occurs when a wireless data from a transmitter reaches the receiver via multiple paths. The multipaths propagation may take place by reflection through bouncing off buildings, refraction through foliage of a tree, and atmospheric effects such as atmospheric ducting and ionospheric reflection. Another cause of inter-symbol interference is the transmission of a signal through a bandlimited channel. In bandlimited channels, above a certain frequency, the frequency response is zero.

In various embodiments, the equalizers are used to reduce inter-symbol interference and allow recovery of the transmitted symbol. In some embodiments, the receiver input 212 is first received by a continuous time linear equalizer 202. The continuous time linear equalizer 202 provides a high pass filter at the receiver 200 and endeavors to boost the higher frequencies at the receiver to bring all frequency components of the receiver input 212 to a similar amplitude. In various embodiments, equalizers are used to equalize the combined characteristics of the transmitter and channel.

In some embodiments, the continuous time linear equalizer 202 (CTLE) output enters a feed forward equalizer 204. The feed forward equalizer 204 (FFE) is a linear equalizer and is used to pre-compensate the channel distortion of a signal.

In some embodiments, the data passes through a decision feedback equalizer 206 (DFE). The decision feedback equalizer 206 is a nonlinear equalizer to compensate the channel distortions by eliminating noise amplification. In various embodiments, the decision feedback equalizer 206 uses previous data detector 208 decisions to eliminate the inter-symbol interference on pulses that are currently being demodulated. In other words, the distortion on a current pulse that was caused by previous pulses is subtracted. The nonlinearity of the decision feedback equalizer 206 stems from the nonlinear characteristic of the data detector that provides an input to the feedback filter.

A data detector 208 at the receiver generates detected data bits or symbols from the output of the equalizers. In some embodiments, the data detector is a simple latch or data slicer. A data slicer slices a voltage at a programmable threshold. In some embodiments, the data detector is an analog to digital converter (ADC). The ADC produces a multi-bit output from which the data may be detected and subsequently an estimate of the error in the detected data may also be computed.

In some embodiments, the receiver samples the channel output at particular time instances to properly detect (e.g., slice) the received data without error. In some embodiments, the data detector 208 adjusts the sampling phase based on the clock and data recovery circuit 210 (CDR circuit) output.

In addition to mitigating the effects of inter-symbol interference or other impairments, according to some embodiments, the receiver uses a clock and data recovery system to sample the signal at a pre-determined sampling phase.

In some embodiments, the receiver equalization and data detection are implemented by a partial response system. In others, the equalization may be provided by a non-return to zero equalizer.

A partial response system equalizes the received signal such that there may be a carefully controlled and a priori determined relationship between consecutive values of (a) equalized received symbols, and (b) the transmitted data. As a non-limiting example in a duobinary partial response system, the nominal relationship (assuming no other impairments and perfect equalization) between the transmitted data and the data slicer output in the receiver may be expressed by Equation 1, where y(n) is the data slicer output at symbol time n and a(n) and a(n−1) are the transmitted data bits at symbol times n and n−1 respectively. The data slicer output y(n) may be decoded into a final received estimate of the received data 214. In the absence of errors, v(n) may match a(n).

Figure 3:
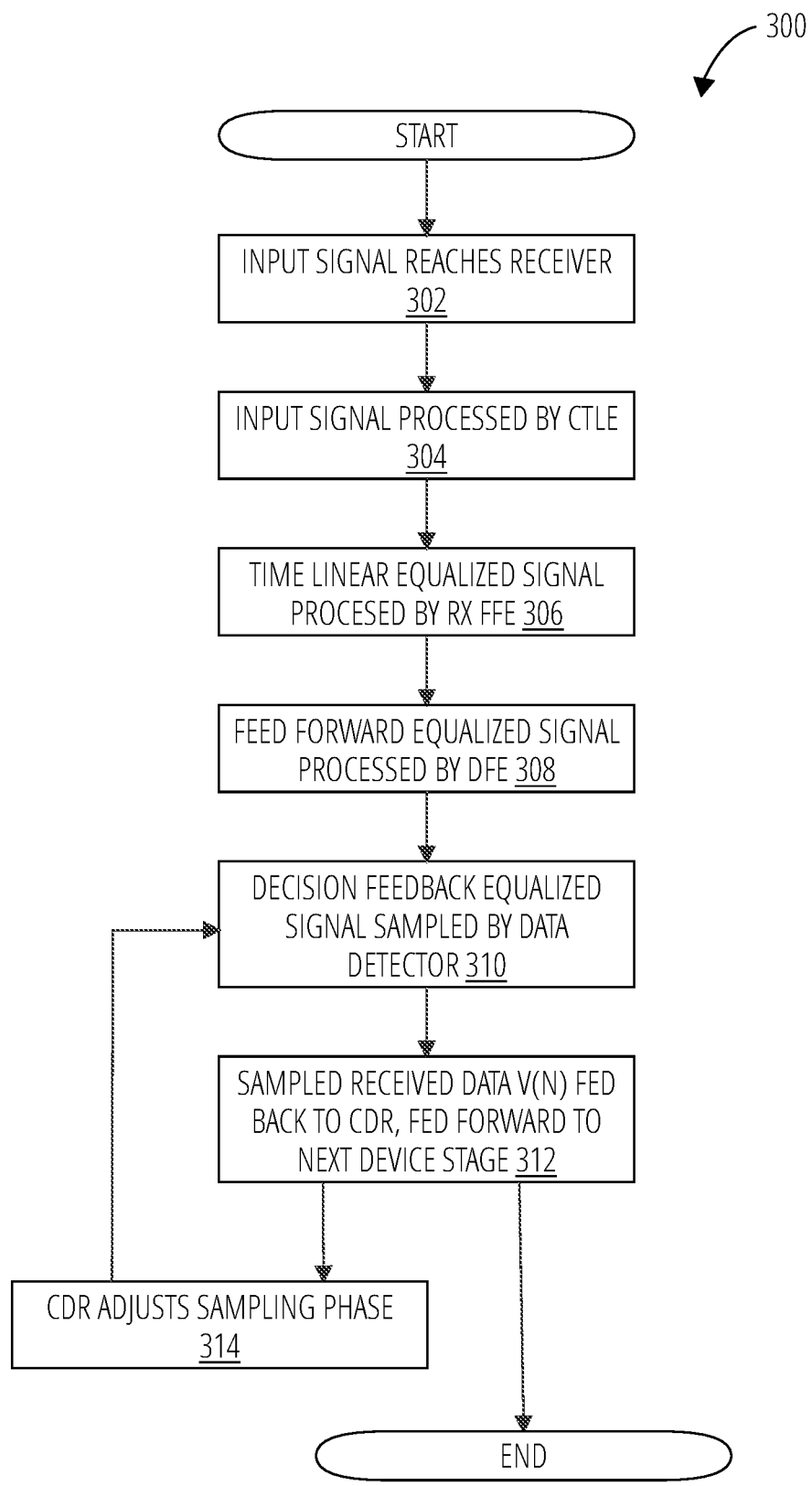
FIG. 3 illustrates a clock and data recovery process 300 in accordance with one embodiment.

FIG. 3 illustrates a clock and data recovery process 300 in accordance with one embodiment. In some embodiments, the clock and data recovery process 300 includes reaching the input signal, e.g., data, to the receiver, as represented by block 302. The clock and data recovery process 300, as represented by block 304, includes processing the input signal by equalizers. In some embodiments, the input signal is processed by a CTLE, shown at block 306, followed by a time linear equalization process by a DFE, as shown at block 308. The decision feedback equalized signal is then sampled by the data detector, as shown at block 310. As represented at block 312, the sampled received data v(n) is fed back to the CDR. In some embodiments, the data is sent to CDR for adjusting the sampling phase, as represented at block 314. In some embodiments, once the CDR has adjusted the sampling phase, the data is fed to the next device stage, as shown at block 312.

FIG. 4 illustrates a block diagram of an exemplary receiver with partial response equalization 400.

In some embodiments, the receiver with partial response equalization 400 includes receiver input 414, a continuous time linear equalizer 402, a receiver feed forward equalizer (receiver feed-forward equalizer 404), a decision feedback equalizer 406, a data detector 408, a clock and data recovery, clock and data recovery circuit 410, and a decoder 412. In various embodiments, the transmission of data through the communication channel introduces inter-symbol interference to the transmitted data at the channel output. The receiver with partial response equalization 400 processes the channel output using equalizers to mitigate the effects of the inter-symbol interference.

In various embodiments, the equalizers are used to reduce inter-symbol interference and allow recovery of the transmitted symbol. In some embodiments, the receiver input 414 is first received by a continuous time linear equalizer 402. The continuous time linear equalizer 402 provides a high pass filter at the receiver with partial response equalization 400 and endeavors to boost the higher frequencies at the receiver to bring all frequency components of the receiver input 414 to a similar amplitude.

The continuous time linear equalizer 402 output may be applied to a receiver feed-forward equalizer 404. The receiver feed-forward equalizer 404 is a linear equalizer and is used to pre-compensate the channel distortion of a signal.

The data may then pass through a decision feedback equalizer 406. The decision feedback equalizer 406 is a nonlinear equalizer to compensate the channel distortions by eliminating noise amplification. The decision feedback equalizer 406 may apply previous data detector 408 decisions to eliminate the inter-symbol interference on pulses that are currently being demodulated.

A data detector 408 generates data bits or symbols from the output of the equalizers. The data detector may be a simple latch or data slicer, or an analog to digital converter (ADC).

The receiver samples the channel output at particular time instances to properly detect (e.g., slice) the received data without error. The data detector 408 may adjust the sampling phase based on the clock and data recovery circuit 410 output. The data detector 408 output y(n) may be decoded into a final received estimate of the transmitted data value, e.g., decoded data 418. it should be noted that, in the absence of errors, v(n) matches a(n).

The receiver equalization and data detection may be implemented by a partial response system. As a non-limiting example in a duobinary partial response system, the nominal relationship (assuming no other impairments and perfect equalization) between the transmitted data and the data slicer output in the receiver may be expressed as per Equation 1 where again, y(n) is the data slicer output at symbol time n and a(n) and a(n−1) are the transmitted data bits at symbol times n and n−1, respectively. Referring to the receiver with partial response equalization 400 of FIG. 4, let y(n) be the received symbol value at the output of the analog to digital converter. These symbols may include all impairments in the system, including inter-symbol interference, noise, cross talk, etc. The decision estimates of the impairment partial response symbols y(n) at the at the output of the receiver's analog to digital converter may be denoted by y^(n). These may take on values of 2, 0, −2 in this example. In various embodiments, error between the received symbol and its decision estimate is represented by e(n) and calculated by Equation 2.

In various embodiments, the data detector 408 sends e(n), y(n), y^(n) 416 to the clock and data recovery circuit 410.

Figure 5:
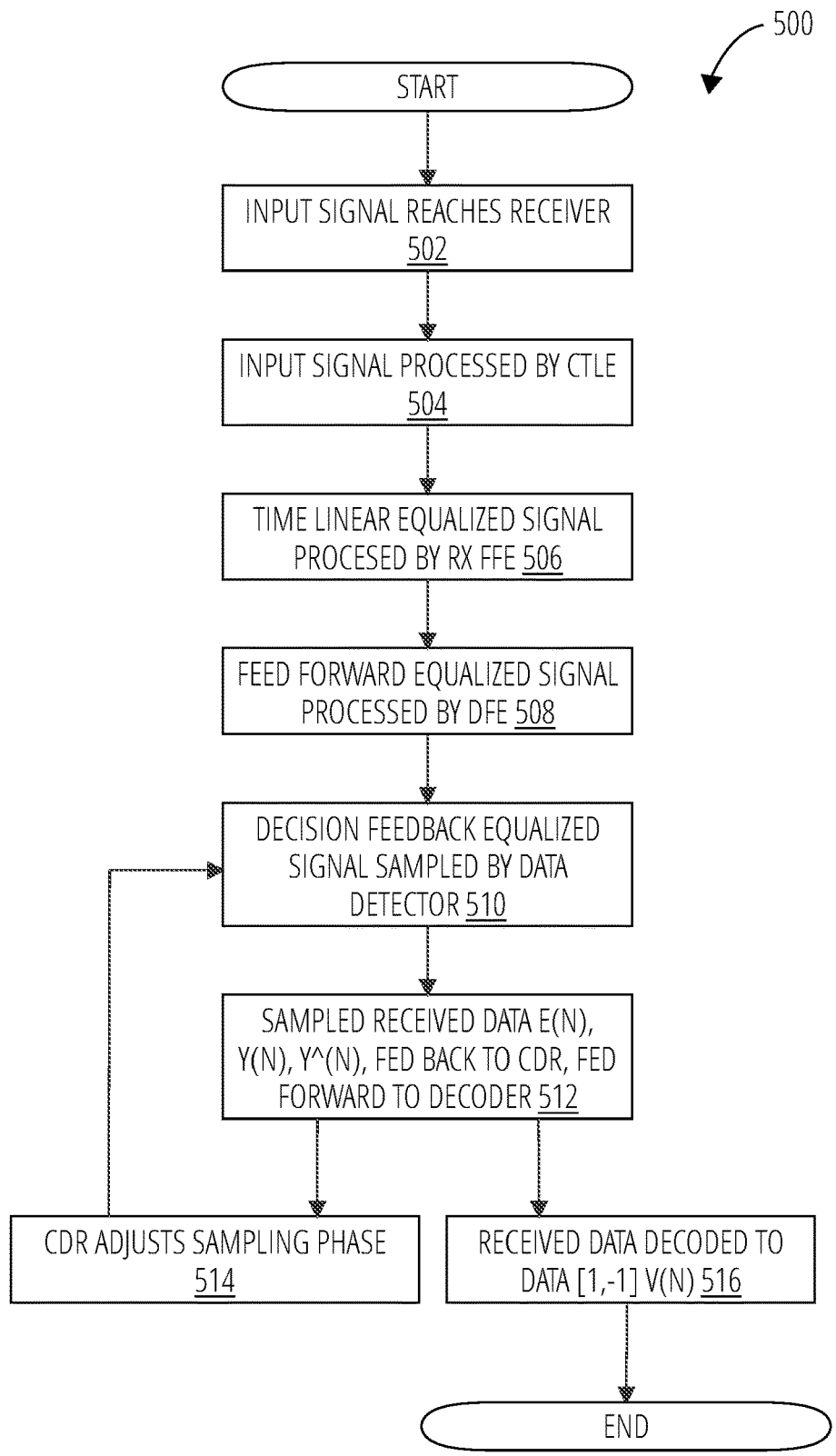
FIG. 5 illustrates a clock and data recovery process 500 in accordance with one embodiment.

FIG. 5 illustrates a clock and data recovery process 500 in accordance with one embodiment. The input signal, e.g., data, in applied to the receiver, as depicted at block 502. The clock and data recovery process 500, as represented at block

504, includes processing the input signal by equalizers. In some embodiments, the input signal is processed by a CTLE, shown at block 506, followed by a time linear equalization process in the form of a DFE, as shown at block 508. The decision feedback equalized signal is then sampled by the data detector, as shown at block 510. As represented by block 512, the received symbol value y(n), the decision estimate yˆ(n) and the error value e(n) is fed back to the CDR. The CDR further adjusts sampling phases, as represented by block 514. In some embodiments, once the CDR has adjusted the sampling phase, the received data is decoded to data with the format [−1,1], as shown at block 516.

FIG. 6 illustrates a clock and data recovery system 600 in accordance with one embodiment. In some embodiments, the clock and data recovery system 600 includes a phase detector 602, a digital loop filter 604 and a clocking element 606 to process data detector output 608 into the recovered clock 610. The data detector output 608 may be used to calculate a timing gradient. An exemplary timing gradient Δ(n) is the Mueller and Muller timing gradient, and may be given by Equation 3, and the gradient may also be expressed as given in Equation 4 or one of the MMSE variants.

These equations may be used to define the output of the phase detector of the clock and data recovery system 600 and drive the clock and data recovery loop filter input.

Figure 7:
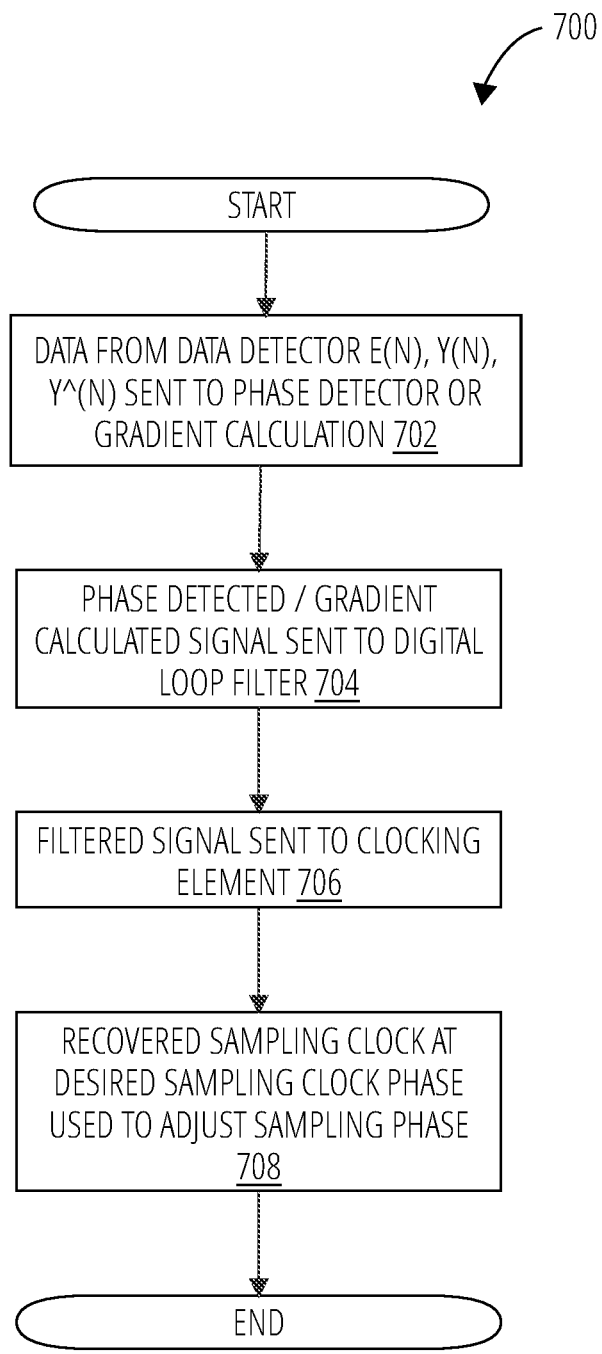
FIG. 7 illustrates a clock and data recovery process 700 in accordance with one embodiment.

FIG. 7 illustrates a clock and data recovery process 700 in accordance with one embodiment. In some embodiments, the clock and data recovery process 700 includes sending data from data detector e(n), y(n), yˆ(n) to phase detector or gradient calculation, as shown at block 702. As represented by block 704, phase detected/gradient calculated signal is sent to digital loop filter. In some embodiments, the clock and data recovery process 700 further includes sending filtered signal to clocking element, as shown at block 706. In some embodiments, the recovered sampling clock at desired sampling clock phase is used to adjust sampling phase, as represented by block 708.

FIG. 8 illustrates a clock and data recovery system 800 in accordance with another embodiment. In some embodiments, the clock and data recovery system 800 includes an accumulated phase calculator 802, a digital loop filter 804 and a clocking element 806 to process data detector output 808 into the recovered clock 810

As an alternative way, in some embodiments, an accumulated version of the gradient may be utilized to drive the loop filter, for example if the gradient is accumulated over L symbols according to Equation 5.

FIG. 8 illustrates an example use of the accumulated gradient driving the loop filter instead of the raw gradient driving the loop filter.

Figure 9:
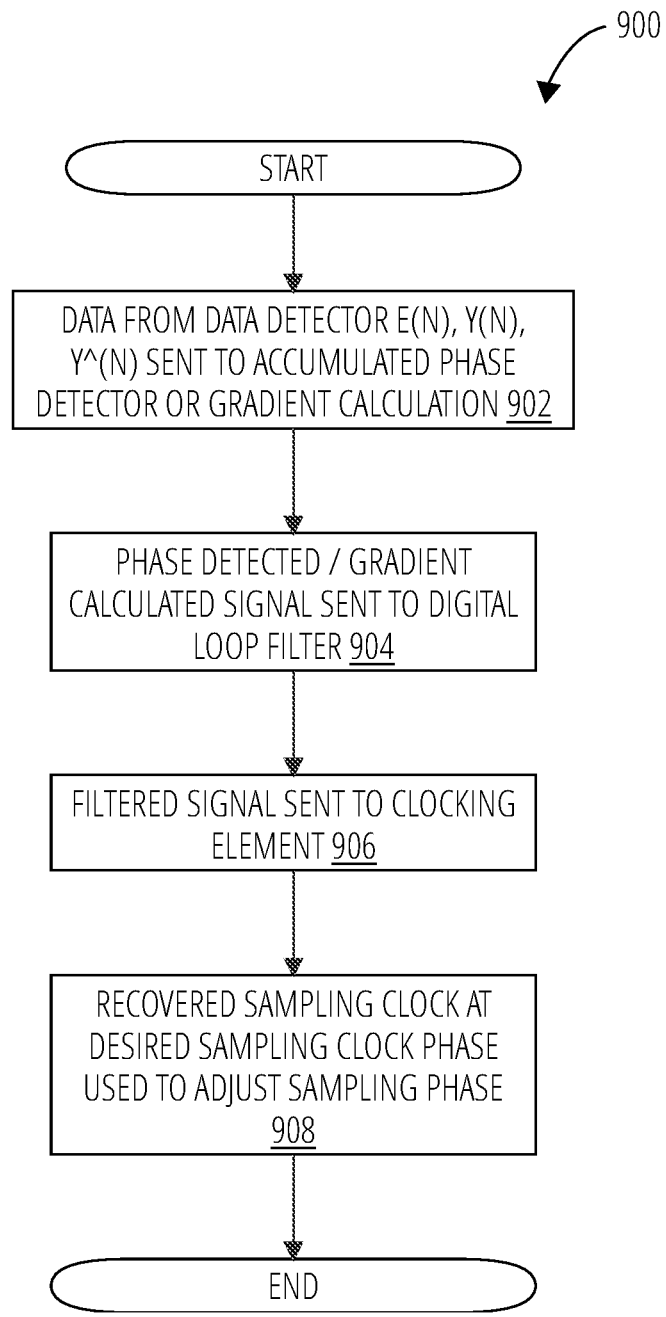
FIG. 9 illustrates a clock and data recovery process 900 in accordance with one embodiment.

FIG. 9 illustrates a clock and data recovery process 900 in accordance with one embodiment. In some embodiments, the clock and data recovery process 900 includes sending data from data detector e(n), y(n), yˆ(n) to accumulated phase detector or gradient calculation, as shown at block 902. As represented by block 904, phase detected/gradient calculated signal is sent to digital loop filter. In some embodiments, the clock and data recovery process 900 further includes sending filtered signal to clocking element, as shown at block 906. In some embodiments, the recovered sampling clock at desired sampling clock phase is used to adjust sampling phase, as represented by block 908.

FIG. 10 illustrates a clock and data recovery system 1000 in accordance with yet another embodiment.

In general, the optimal clock and data recovery sampling phase, a partial response system's consecutive equalized data detected symbols may have a clear relationship. For example, in the 1+D or partial response system as noted in Equation 1, for a transmitted data sequence comprised of symbols 1 and −1, the impairment less received sequence of decisions may take on values of 2, 0, or −2. In the absence of significant sampling phase or timing errors, the partial response may constrain the received symbols at the output of the data slicer to be such that a 2 can never be followed by a subsequent −2 or vice-versa.

However, if the initial sampling phase is 0.5T offset from the optimal sampling phase, or in the presence of large frequency offset between the transmitter and receiver clocks, the relationship may be violated and may be detected digitally with a digital error detector by examining the corresponding data sliced symbols. This fact may be exploited to detect such illegal symbol detected conditions using an illegal data detector. The illegal data detector may count occurrences of consecutive illegal conditions (i.e., 2 followed by −2 or −2 followed by 2) in the ˆ( ) values.

The number of such illegal decisions may be subject to some filtering constraints, such as the number of such conditions exceeding some threshold T over some measurement window W. Having such a condition may help distinguish between cases when an illegal condition is due to a large phase error (which may result in multiple contiguous illegal cases) versus an isolated illegal condition which may be caused by instantaneous noise or jitter impairment. If the illegal condition is met, an additional increment of magnitude Km may be injected on top of the normal accumulated gradient. The injected value may also be qualified by the sign of how the gradient was accumulating in the short term past (i.e., we choose the sign of K such that it adds in the same direction which the gradient accumulation was proceeding). This is represented by Equation 6.

A block diagram of one embodiment of such a clock and data recovery system 1000 is shown in FIG. 10.

In this embodiment, the injected increment is not applied to the accumulated gradient but is instead applied directly to the clock element.

To that end, the clock and data recovery system 1000 includes a data detector 1002, an illegal data detector 1004, window/threshold logic 1006, an accumulated phase detector 1008, a digital loop filter 1010 and a clocking element 1012. In some embodiments, the illegal data detector 1004 receives data from the data detector 1002 and detects illegal decisions. The window/threshold logic 1006 determines whether the number of occurrence of the illegal decisions in exceeds a pre-defend number over a pre-defined time period and whether to add additional increment of magnitude Km, e.g., (T, W, Km) 1016. The window/threshold logic 1006 is fed the sign of past accumulated gradient by the accumulated phase detector 1008. The window/threshold logic 1006 then calculates the injected increment value K and sends it to the digital loop filter 1010 which is subsequently fed to the clocking element 1012. The output of the clocking element 1012 is recovered clock 1014.

For example if the clock element is a phase interpolator, a conventional clock and data recovery operation may utilize the clock and data recovery loop filter to instruct the phase interpolator to advance or retard by a certain phase amount or, equivalently, by a certain number of digital phase codes, as calculated by the loop filter.

Figure 11:
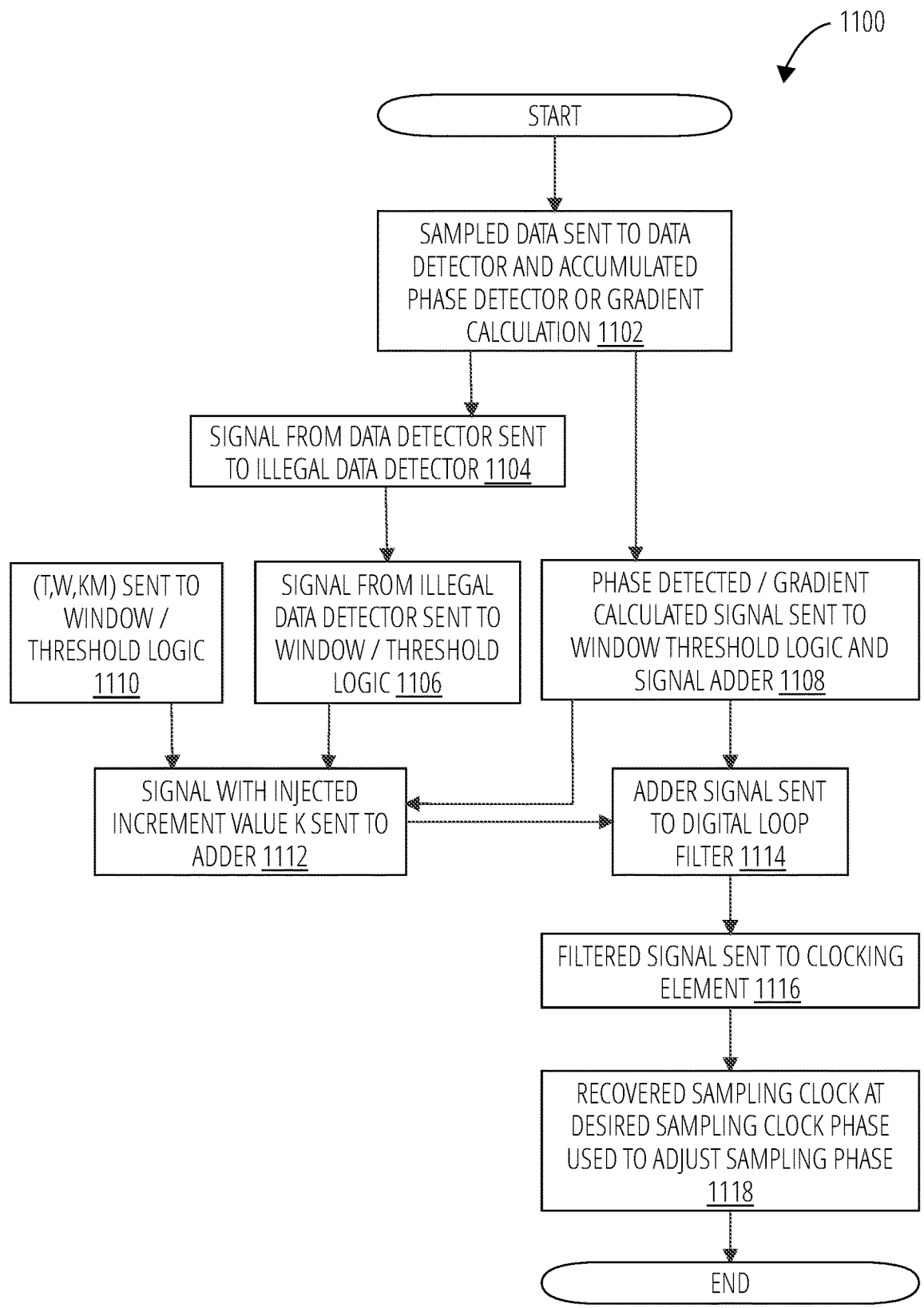
FIG. 11 illustrates a clock and data recovery process 1100 in accordance with one embodiment.

FIG. 11 illustrates a clock and data recovery process 1100 in accordance with one embodiment. The clock and data recovery process 1100 includes sending sampled data to data detector and accumulated phase detector or gradient calculation, as shown at block 1102. The signal from data detector is sent to illegal data detector, as represented by block 1104. The signal from illegal data detector is further sent to window/threshold logic, as shown at block 1106. After sending the sampled data to data detector and accumulated phase detector or gradient calculation, the phase detected/ gradient calculated signal is sent to window threshold logic and signal adder, as represented by block 1108. The clock and data recovery process 1100 includes calculating after receiving (T, W, Km), which is shown at block 1110, and sending the signal with injected increment value K to adder, as shown at block 1112. At block 1114, the adder signal is sent to digital loop filter. The clock and data recovery process 1100 further includes sending the filtered signal to a clocking element, as represented by block 1116 and using the recovered sampling clock at a desired sampling clock phase to adjust the sampling phase, as shown at block 1118.

FIG. 12 illustrates a clock and data recovery system 1200 in accordance with yet another embodiment in which an increment may be injected as additional phase codes the phase interpolator may traverse, in addition to what it may have been directed to traverse by the loop filter.

To that end, the clock and data recovery system 1200 includes a data detector 1202, an illegal data detector 1204, a window/threshold logic 1206, an accumulated phase detector 1208, a digital loop filter 1210 and a clocking element 1212. In some embodiments, the illegal data detector 1204 receives data from the data detector 1202 and detects illegal decisions. The window/threshold logic 1206 determines whether the number of occurrence of the illegal decisions exceeds a pre-defend number over a pre-defined time period and whether to add additional increment of magnitude Km, e.g., (T, W, Km) 1214. The window/threshold logic 1206 is fed the sign of past accumulated gradient by the accumulated phase detector 1208. The accumulated phase detector 1208 further feeds the digital loop filter 1210. The window/threshold logic 1206 then calculates the injected increment value K and sends it to the clocking element 1212. The output of the clocking element 1212 is recovered clock 1216.

The disclosed mechanisms may apply to partial response systems beyond the examples discussed herein. Using a different partial response means that the criterion to determine illegal detected data symbols may change accordingly. The illegal data detection criterion may be derived from the specific partial response system under consideration.

Other embodiments may apply the injected increment value at different points within the clock and data recovery loop filter. In the example embodiments, the injected increment is applied to the timing estimate calculated at the input or output of the loop filter. Other variations may apply the injected increment to some intermediate point inside the loop filter. This may be beneficial for optimizing the fixed point details of the clock and data recovery loop filter behavior with respect to internal clipping values inside the loop filter.

Figure 13:
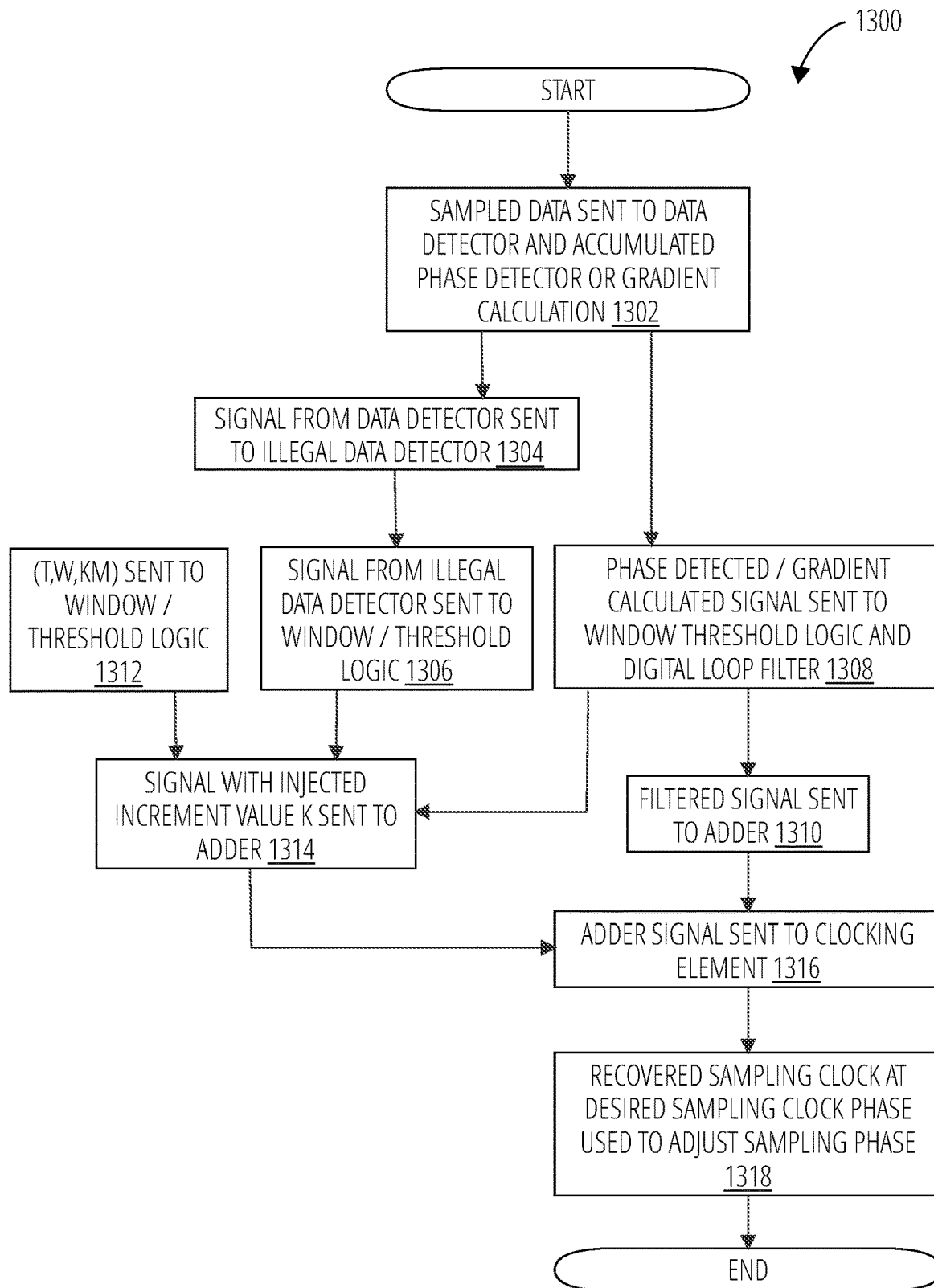
FIG. 13 illustrates a clock and data recovery process 1300 in accordance with one embodiment.

FIG. 13 illustrates a clock and data recovery process 1300 in accordance with one embodiment. In some embodiments, the clock and data recovery process 1300 includes sending sampled data to data detector and accumulated phase detector or gradient calculation, as shown at block 1302. In some embodiments, the signal from data detector is sent to illegal data detector, as represented by block 1304. The signal from illegal data detector is further sent to window/threshold logic, as shown at block 1306. In some embodiments, after sending the sampled data to data detector and accumulated phase detector or gradient calculation, the phase detected/ gradient calculated signal is sent to window threshold logic and digital loop filter, as represented by block 1308. In some embodiments, the clock and data recovery process 1300 includes sending the filtered signal to adder, as shown at block 1310. The (T, W, Km) is the sent to the window/ threshold logic, as shown at block 1312, followed by sending the signal with injected increment value K to adder, as represented by block 1314. The clock and data recovery process 1300 further includes sending adder signal to the clocking element, as shown at block 1316. The clock and data recovery process 1300 then includes using recovered sampling clock at desired sampling clock phased to adjust sampling phase, as shown at block 1318.

Referring to FIG. 14, in a traditional NRZ (non-return to zero) equalized system the data detector is typically a slicer (as opposed to an ADC) that slices the analog sampled equalized signal at 0 to produce decision values of 1 or −1. For the traditional NRZ equalized system, $a(n)=\hat{y}(n)$. The slicing operation can be described as follows:

$\hat{y}(n)=1$ if $y(n)>=0$
$\hat{y}(n)=-1$ if $y(n)<0$ where y(n) is the analog sampled equalized signal. This slicing operation may be implemented using a single comparator which compares the analog voltage y(n) to a 0 voltage reference to determine whether to output a 1 or 0 which equivalently is correlated to 1 or −1 as denoted above.

Because there is no memory in the relationship between a(n) and $\hat{y}(n)$, an illegal symbol cannot be detected directly from examining the above $\hat{y}(n)$ as described for partial response equalized systems. However, if y(n) is sliced and evaluated using an enhanced comparison then it is possible to determine an illegal condition for the y(n) value which corresponds to the CDR recovered clock sampling phase not being positioned correctly. For example the following comparator operations may be utilized in one embodiment:

$yA(n)=1$ if $y(n)>=vthr$
$yA(n)=0$ if $y(n)<vthr$
$yB(n)=1$ if $y(n)>=0$
$yB(n)=0$ if $y(n)<0$
$yC(n)=1$ if $y(n)>=-vthr$
$yC(n)=0$ if $y(n)<-vthr$ Applying the results of the algorithm above yields a computation for $\hat{y}(n)$ based on the non-return to zero detector logic 1400 in FIG. 14.

The above comparator outputs in conjunction with the above table provide the sliced value $\hat{y}(n)$ along with whether or not the corresponding symbol is considered to be legal or illegal. When the analog sampled signal y(n) is "weak" i.e. falls between vthr and −vthr it is evaluated to be an illegal symbol. If it falls above vthr or below −vthr it is evaluated to be a good legal/reliable symbol with corresponding sliced values of 1 or −1. In other respects an NRZ system may be implemented as described herein for partial response systems.

Figure 15:
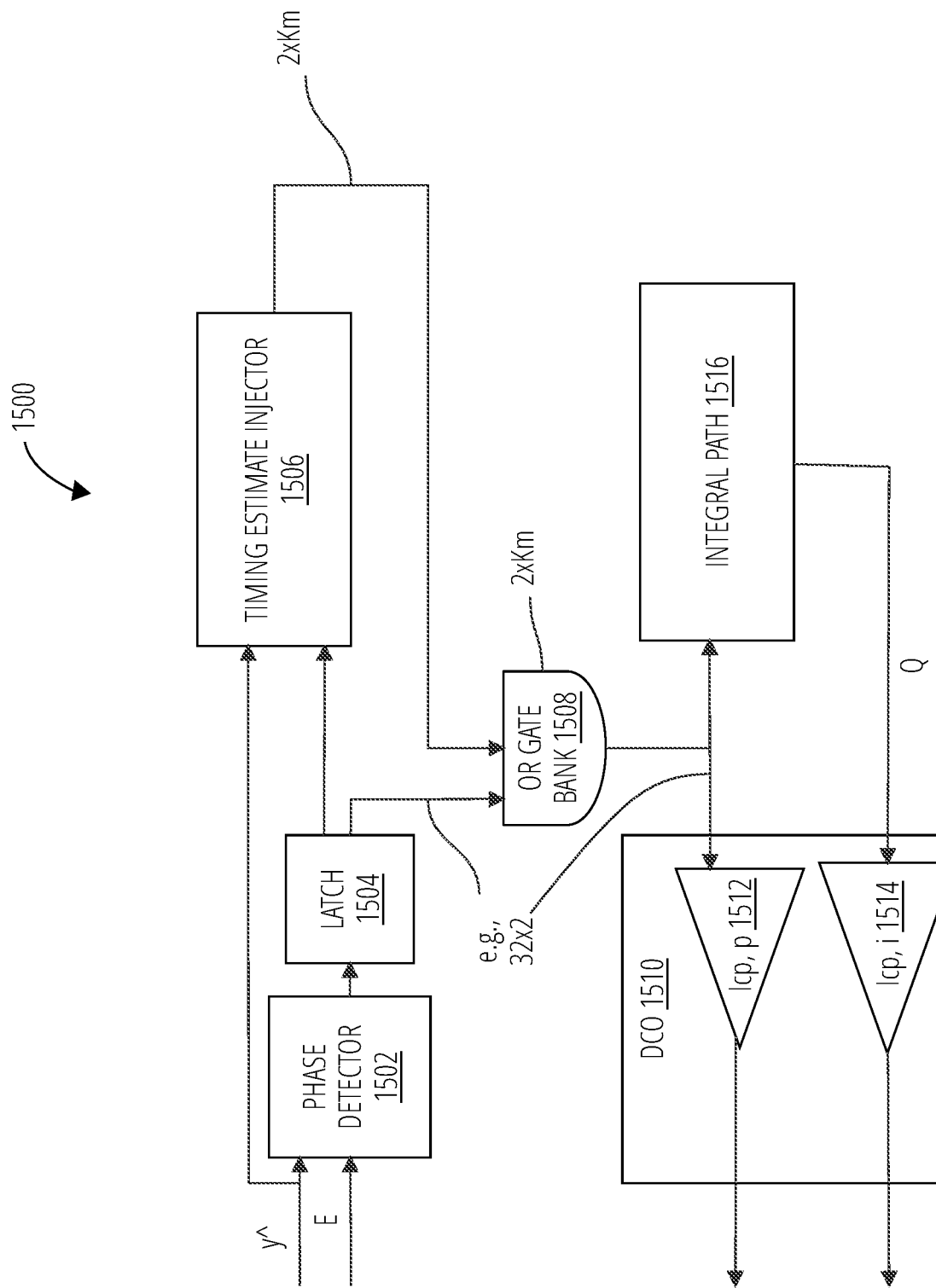
FIG. 15 illustrates a voltage-controlled oscillator based clock data recovery 1500 in accordance with one embodiment.

FIG. 15 illustrates voltage-controlled oscillator based clock data recovery 1500 in one embodiment. A digital loop filter followed by a VCO is also known as a digital controlled oscillator (DCO) based clock data recovery. For a VCO based clock data recovery a typical second order loop filter consists of a proportional and integral path. The proportional path is simply a gained version of the phase detector output which is scaled by the proportional VCO clocking element. The integral path performs a digital integrating or accumulation operation of the phase detector output before being scaled by the integral VCO clocking element before being added to the output of the proportional path. The clocking element may for example be implemented using a charge pump (cp) followed by an oscillator.

An exemplary case is when the phase detector outputs consist of a stream of "ups" and "downs" or no update values. If represented by two bits or two wires a phase detector "up" consists of the up wire being activated and the down wire not being activated. A phase detector "down" consists of the up wire not being activated and the "down" wire being activated. No update from the phase detector is represented by no activation on either "up" or "down" wires.

In a typical clock data recovery implementation the phase detector output will typically be processed in chunks of time intervals of which exemplary values are 8 Tb, 16 Tb, 32 Tb, 64 Tb where Tb is the baud period. The number of phase detector outputs across this time interval can be represented either by that many pairs of up/down wires or equivalently as a digital integer sum of all the up/downs across the time interval, or it may be represented in both formats for use differently by different parts of the loop filter.

FIG. 15 depicts such an exemplary VCO or DCO based clock data recovery. A voltage-controlled oscillator based clock data recovery 1500 system as depicted comprises a phase detector 1502; a latch 1504; a timing estimate injector 1506; an OR gate bank 1508; a DCO 1510; a proportional path charge pump (Icp, p 1512); and an integral path charge pump (Icp, i 1514) on an integral path 1516. This exemplary clock data recovery system has the phase detector 1502 outputs across an interval of 32T (as set for example by latch 1504) driving the proportional path of the DCO 1510 by a proportional path charge pump current (Icp, i 1514) which controls the proportional VCO (not depicted). Because each up/down pair is represented by two wires, there are a total of 32×2 wires. The 32 phase detector 1502 up/downs are also input to the integral path 1516 where they are accumulated digitally to form a digital sum and further processed by the integral path 1516 before being converted to a multi-bit number driving a multi-bit (Q bits) integral path charge pump digital to analog converter (DAC) represented by Icp, i 1514. Icp, i 1514 controls the integral path VCO (not shown here).

For this exemplary clock data recovery implementation, the timing estimate injector 1506 can be incorporated into the clock data recovery behavior in an efficient manner by using a number of digital OR logic gates (the OR gate bank 1508). The timing estimate injection with magnitude Km is also represented by Km up/down wires. For example suppose Km=+8 then eight up wires are activated by the timing estimate injection logic and the corresponding down wires are not activated. These 2×Km wires are then logically OR'd with 2×Km up/down wires from the main or raw phase detector up/down path. No actual digital addition is performed keeping the implementation simple and moreover without increasing the bit width of the signal input to the integral path 1516. Although no digital addition is performed, the above implementation with OR gates is equivalent to adding 32 [4, 0, 1] phase detector outputs to Km value that are distributed over 32T worth of [4, 0, 1] up/downs.

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

"Logic" is used herein to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A communication system comprising:
   a data communication channel; and
   a data receiver configured to receive a set of data through the data communication channel, the data receiver comprising a data detector and a clock and data recovery device, the data receiver further configured to:
   operate the data detector to generate data bits from each of the set of data;
   determine a corresponding decision estimate for each of the data bits; and
   determine a sign-sign error for each of the data bits, the sign-sign error being a difference between a data bit and the corresponding decision estimate;
   wherein the clock and data recovery device is configured to:
   apply the sign-sign error to determine an increment to affect an output of a phase detector associated with the clock and data recovery device, wherein a sign of the increment is determined from a sign or direction of an accumulated version of a clock and data recovery gradient value.

2. The system of claim 1, wherein the accumulated version of the clock and data recovery gradient value is determined based on a sum of timing gradient values for each symbol time in a pre-determined time interval.

3. The system of claim 1, wherein the data receiver is further configured to:
   determine a number of consecutive decision estimates in a pre-determined measurement time interval that satisfy one or more criteria;
   in response the number of consecutive decision estimates satisfying the one or more criteria, determine an additional increment;
   add the additional increment to the accumulated version of the clock and data recovery gradient value; and
   determine a total increment to affect the output of the phase detector.

4. The system of claim 3, wherein the total increment is determined by:

$$K=Km*\text{sign}(\Delta L(n-S))$$

wherein
K is the total increment;
Km is a magnitude of the increment; and
$\Delta L(n-S)$ is an extent of a gradient to utilize.

5. The system of claim 3, wherein the data detector is a data slicer.

6. The system of claim 1, wherein the data receiver is a receiver with partial response equalization.

7. A method for clock and data recovery comprising:
   receiving, by a data receiver, a set of data through a communication channel;
   generating, by the data receiver, data bits from each of the set of data;
   determining, by the data receiver, a corresponding decision estimate for each of the data bits;
   determining, by the data receiver, an error for each of the data bits, the error being a difference between a data bit and the corresponding decision estimate; and
   determining from the error for each of the data bits, by a clock and data recovery device associated with the data receiver, an increment to affect an output of a phase detector associated with the clock and data recovery device, wherein a sign of the increment is determined from a sign or direction of an accumulated version of a clock and data recovery gradient value.

8. The method of claim 7 further comprising:
   determining, by the data receiver, a number of consecutive decision estimates, in a pre-determined measurement time interval, that satisfy one or more criteria;
   in response to the number of consecutive decision estimates satisfying the one or more criteria, determining, by the data receiver, an additional increment;
   adding, by the data receiver, the additional increment to the accumulated version of the clock and data recovery gradient value; and
   determining, by the data receiver, a total increment to affect the output of the phase detector.

9. The method of claim 8, wherein the total increment is determined by:

$$K=Km*\text{sign}(\Delta L(n-S))$$

wherein
K is the total increment;
Km is a magnitude of the increment; and
$\Delta L(n-S)$ is an extent of a gradient to utilize.

10. The method of claim 7, wherein the data receiver is a receiver with partial response equalization.

* * * * *